Patented Oct. 9, 1945

2,386,183

UNITED STATES PATENT OFFICE 2,386,183

ANTIFREEZE COMPOSITION

Frederick R. Balcar, Stamford, Conn., assignor, by mesne assignments, to U. S. Industrial Chemicals, Inc., New York, N. Y., a corporation of Delaware No Drawing. Application December 11, 1943, Serial No. 513,955

5 Claims. (Cl. 252—76)

This invention relates to compositions generally referred to as "antifreeze" and especially to such compositions designed to inhibit corrosion and rust formation in the cooling systems of internal combustion engines.

For many years it has been customary to mix ethylene glycol with water in the engine cooling systems of motor vehicles for the purpose of depressing the freezing point. Various rust inhibitors have been added to such water solutions of ethylene glycol, but none is entirely satisfactory. It is desirable to provide a uniform product with the proper proportion of corrosion and rust inhibiting elements therein with ethylene glycol to prevent freezing and corrosion of the cooling system.

It is the object of the present invention to provide a glycol antifreeze composition in which corrosion and rust inhibiting elements are thoroughly and uniformly disseminated and mechanically inseparable.

Another object of the invention is the provision of a glycol antifreeze composition which is free from soap and other foam-inducing elements so that loss of liquid from the cooling system due to foaming is avoided.

Other objects and advantages of the invention will be apparent as it is better understood by reference to the following specification, in which the preferred embodiments of the invention are described.

I have discovered that glycol monoricinoleate may be dissolved in a solution of ethylene glycol in water and forms a satisfactory composition adapted not only to depress the freezing point in proportion to the amount of ethylene glycol used, but also to prevent substantial corrosion of the cooling system. In order to be suitable for the purpose, the glycol monoricinoleate must be substantially free from soap. Much of the glycol monoricinoleate heretofore available has contained minute proportions of soap sufficient, however, to cause foaming in a cooling system. It is essential, therefore, to prepare ethylene glycol monoricinoleate by methods which ensure absence of soap in the product.

It is possible to prepare ethylene glycol monoricinoleate in various ways to meet the conditions mentioned. For example, ethylene glycol and ricinoleic acid in equimolecular quantities or preferably with an excess of glycol may be heated in the presence of traces of sulphuric acid. Ethylene glycol monoricinoleate is formed, together with some water. Removal of the water by distillation will hasten the esterification and result in more rapid conversion. The small amount of sulphuric acid present in the final product may be neutralized by the addition of a suitable alkali such as sodium hydroxide, sodium carbonate, barium hydroxide or the like. The product is free from soap and satisfactory for the purpose of the present invention. Any other esterification method which ensures the elimination of soap from the product may be employed.

To prepare an antifreeze, I dissolve in glycol a suitable proportion of the ethylene glycol monoricinoleate. The amount used may vary. A relatively small quantity is sufficient, in general from 1% to 3% by volume. Lesser or greater amounts can be used, as for example from 0.5% up to 5%. The higher proportion serves no useful purpose, however, in the application of the invention.

In the preparation of antifreeze for commercial purposes, it is desirable to add other ingredients which supplement the element glycol monoricinoleate as a corrosion inhibitor. The reaction product of an alkali metal compound such as sodium hydroxide and boric acid is a desirable addition, and I may therefore introduce sodium hydroxide with sufficient boric acid to neutralize it, forming sodium borate which is an excellent rust inhibitor. The proportions may vary, though relatively small quantities of these ingredients are desirable in the commercial product. Likewise, it is desirable to include a small proportion of sodium nitrite which has marked properties as a corrosion inhibitor.

As an example of a commercial antifreeze, the following composition is satisfactory. The proportions as indicated are subject to considerable variation.

| | |
|---|---|
| Glycol _____gallons__ | 97.35 |
| 40% (by weight) aqueous sodium hydroxide _____gallons__ | 0.655 |
| Boric acid (preferably powder) __pounds__ | 5.45 |
| 40% (by weight) aqueous sodium nitrite _____gallons__ | 0.095 |
| Ethylene glycol monoricinoleate___do____ | 1.50 |

A suitable dye to give the solution any desired color may be added in the required proportions.

In preparing the composition, it is preferable to follow the following procedure. First stir the sodium hydroxide solution into the glycol. Dissolve the boric acid therein with active stirring. Heating to about 70° C. may be resorted to to accelerate the solution. Thereafter stir in the nitrite solution and the glycol monoricinoleate.

The composition as described does not attack rubber and when mixed with water in the usual proportions employed in engine cooling systems there in no tendency to foam. Upon dilution with water, in the ratio of 1:1 or with higher proportions of water, the monoricinoleate is thrown out of solution as a stable emulsion. It acts as a protective film forming agent to coat the surfaces which are subject to corrosion. Tests conducted in such systems have demonstrated that the antifreeze in suitable proportions will depress the freezing point as required and afford an excellent anti-corrosive and rust preventative. The glycol monoricinoleate does not separate from the glycol in shipment or storage and consequently can be dispensed without any special precautions to ensure delivery to the consumer of a uniform product having the desired properties Various changes may be made in the composition and the details of procedure as described without departing from the invention or sacrificing the advantages thereof.

I claim:

1. A composition for use as an antifreeze in the cooling systems of internal combustion engines consisting essentially of a solution in ethylene glycol of from 0.5% to 5% of ethylene glycol monoricinoleate substantially free from soap.

2. A composition for use as an antifreeze in the cooling systems of internal combustion engines consisting essentially of a solution in ethylene glycol of from 1% to 3% of ethylene glycol monoricinoleate substantially free from soap.

3. A composition for use as an antifreeze in the cooling systems of internal combustion engines consisting essentially of a solution in ethylene glycol of from 0.5% to 5% of ethylene glycol monoricinoleate substantially free from soap and an alkali metal borate.

4. A composition for use as an antifreeze in the cooling systems of internal combustion engines consisting essentially of a solution in ethylene glycol of from 0.5% to 5% of ethylene glycol monoricinoleate substantially free from soap and an alkali metal nitrite.

5. A composition for use as an antifreeze in the cooling systems of internal combustion engines consisting essentially of a solution in ethylene glycol of from 0.5% to 5% of ethylene glycol monoricinoleate substantially free from soap, an alkali metal borate and an alkali metal nitrite.

FREDERICK R. BALCAR.